US006978379B1

(12) United States Patent
Goh et al.

(10) Patent No.: US 6,978,379 B1
(45) Date of Patent: Dec. 20, 2005

(54) CONFIGURING COMPUTER SYSTEMS

(75) Inventors: Cheh Goh, Bristol (GB); Casassa Mont Marco, Bristol (GB); Adrian John Baldwin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/578,503

(22) Filed: May 26, 2000

(30) Foreign Application Priority Data

May 28, 1999 (GB) .................................... 9912494

(51) Int. Cl.[7] .............................................. H04L 9/00

(52) U.S. Cl. ......................................... 713/200; 713/1

(58) Field of Search .................... 713/1, 100, 200–201; 709/228, 220, 242, 221, 223, 246

(56) References Cited

U.S. PATENT DOCUMENTS

| 5,751,967 A | 5/1998 | Raab et al. |
| 5,797,128 A * | 8/1998 | Birnbaum ....................... 707/5 |
| 6,256,741 B1 * | 7/2001 | Stubblebine ................ 713/201 |
| 6,539,026 B1 * | 3/2003 | Waclawsky .................. 370/428 |

FOREIGN PATENT DOCUMENTS

| WO | 96/26588 | 8/1996 |
| WO | 98/54644 | 12/1998 |

OTHER PUBLICATIONS

PC Week, n16, v2, p 14, Jan. 11, 1999, "Building Better PC Management," Erica Schroder, ISSN: 0740-1604.
e-Business Advisor, v16, n11, p40, Nov. 1998, "Keep an Eye on Your Network," Mike Finn.
Computer Shopper, v18, n2,p375, Feb. 1998, Pretty Good Privacy's PGP Certificate Server, William Wong, ISSN: 0886-0556.
Windows Sources, v5, n1,p205, Jan. 1997, "Be Master of Your Domain," Joseph Moran, ISSN: 1065-9641.

* cited by examiner

*Primary Examiner*—Hosuk Song

(57) ABSTRACT

An apparatus (22,44) is described for use in generating configuration information for a computer system (12) employing hierarchical entities.

A policy template (24) is employed which contains a definition of an abstract high-level policy, for the configuration of the system, and permitted refinements to that policy, the definition referring to a plurality of the entities. An information and system model (16) contains information about the computer system and its environment including the entities referred to in the high-level policy definition, the hierarchy thereof and non-hierarchical relations between the entities. A policy authoring engine (26) refines the high-level policy definition with reference to the permitted refinements thereto and the stored information about the entities to which the high-level policy definition relates in order to produce a refined policy definition. In doing this, the engine presents refinement options to a user (10) via a user interface (28) and refines the high-level policy definition in dependence upon options selected by the user via the user interface. Some of the entities stored in the model (16) may be abstract entities, but with pointers to data in the computer system representing an instance of that abstract entity. The refined policy may be in terms of a policy context, referring to unbound entities, and a policy statement. A policy deployer (20) stores rules for interpreting the policy statement as instructions executable by the computer system and is operable, with reference to the information and system model (16), to bind the unbound entities in the policy context to instances of those entities, and, with reference to the stored rules, to interpret the policy statement into a series of instructions to the computer system referring to the bound instances or derivatives of them.

The apparatus facilitates the refinement of abstract policies and implementation of the refined policies.

32 Claims, 2 Drawing Sheets

CONFIGURING COMPUTER SYSTEMS

This invention relates to apparatuses and methods for use in generating configuration information for computer systems.

Organisations having computer systems have a need to draw up policy. Purely as an example, a high-level, abstract policy might be a security policy, that access to information is to be restricted. That policy then needs to be refined, for example to specify who has what sort of access to which information. The refined policy then needs to be implemented as instructions to the computer system which cause it to enforce the refined policy. This invention, or various aspects or embodiments of it, are concerned with facilitating this procedure.

In accordance with a first aspect of the present invention, there is provided an apparatus for use in generating configuration information for a computer system employing hierarchical entities, the apparatus comprising: means for receiving a definition of a high-level policy, for the configuration of the system, and permitted refinements to that policy, the definition referring to a plurality of the entities; means for storing information about the computer system and its environment including the entities, the hierarchy thereof and non-hierarchical relations between the entities; and a processor coupled to the receiving means and the storing means and operable to refine the high-level policy definition with reference to the permitted refinements thereto and the stored information about the entities to which the high-level policy definition relates in order to produce a refined policy definition deployable on the computer system.

By employing a high-level policy definition which includes defined permitted refinements to that policy, and by employing the stored information about the computer system to which the policy is to be applied, the process of refining the policy can be automated, or at least a considerable amount of assistance and guidance may be provided to a user (via a user interface with which the user can interact with the apparatus) who is involved in refining the policy.

For example, the processor is preferably operable, in accordance with the high-level policy definition, to present refinement options to the user via the user interface and to refine the high-level policy definition in dependence upon options selected by the user via the user interface.

In accordance with a second aspect of the present invention, there is provided an apparatus for use in generating configuration information for a computer system employing hierarchical entities, the apparatus comprising: means for receiving a definition of a high-level policy, for the configuration of the system, and permitted refinements to that policy, the definition referring to a plurality of the entities; a user interface with which a user can interact with the apparatus; a processor coupled to the receiving means and the user interface and operable, in accordance with the high-level policy definition, to present refinement information to the user via the user interface so that a refined policy definition deployable on the computer system can be produced. It may be that the apparatus is arranged so that the user is presented with sufficient information in an understandable format that they themself can then produce the refined policy. However, the processor is preferably operable to present the refinement information to the user as refinement options and to refine the high-level policy definition in dependence upon options selected by the user via the user interface to produce the refined policy definition.

The apparatus of the first or second aspect of the invention preferably includes a library of policy templates, each template including a respective such high-level policy definition and respective such permitted policy refinements, the library being coupled to the receiving means, and a desired one or more of the policy templates being selectable by the user via the user interface for supply to the receiving means. The user can therefore select that one of the policy templates which provide the most appropriate starting point for the refined policy which is to be produced.

The policy templates preferably have a common format. The policy template format preferably provides for each policy template to have a plurality of components executable in turn by the processor, at least one of the components being a flow directive and causing the processor to present refinement options to the user via the user interface and to jump to one of a plurality of the other components in dependence upon the flow directive and the selection made by the user via the user interface. In view of the permitted refinements and flow directives incorporated in the policy templates, the templates can contain a considerable amount of expert knowledge, thus reducing the amount of knowledge required of a user when a policy is to be refined and implemented.

In the case where at least some of the entities stored in the storing means are abstract entities, the storing means preferably also includes, for each such abstract entity, a pointer to data in the computer system representing an instance of that abstract entity. This enables the high-level policies to be written in a generic form, but for information about the real world of the computer system to be presented to the user during refinement and to be incorporated into the refined policies. Also, in some examples of the invention which will be described in more detail below, the refined policy is in terms of a policy context referring to unbound entities and a policy statement. In this case, the apparatus preferably includes means for storing rules for interpreting the policy statement as instructions executable by the computer system, and the processor is preferably operable, with reference to the entity storing means, to bind the unbound entities in the policy context to instances of those entities, and, with reference to the rule storing means, to interpret the policy statement into a series of instructions to the computer system referring to the bound instances or derivatives of them. Accordingly, implementation of the refined policy can be automated either fully or to a substantial extent.

These features may be provided independently of the refinement features of the first and second aspects of the invention. Therefore, in accordance with a third aspect of the present invention, there is provided an apparatus for use in generating configuration information for a computer system, the apparatus comprising: means for receiving a policy (e.g. a refined policy), for the configuration of the computer system, in terms of a policy context referring to unbound entities and a policy statement; means for storing, for each of the unbound entities, a pointer to data in the computer system representing at least one instance of that entity; means for storing rules for interpreting the policy statement as instructions executable by the computer system; and a processor which is operable, with reference to the pointers, to bind the unbound entities in the policy context to instances of those entities, and, with reference to the interpretation rules, to interpret the policy statement into a series of instructions to the computer system referring to the bound instances or derivatives of them.

Various optimisations may be made to this process. For example, the processor is preferably operable to determine a group of the bound instances, and at least one of the instructions refers to such a determined group. In this case, the processor is preferably operable to determine, with reference to the entity storing means, whether such a determined group is already defined in the computer system and, if not, to generate such an instruction to create the determined group in the computer system.

In accordance with other aspects of the present invention, there are provided corresponding methods for use in generating configuration information for computer systems.

A specific embodiment of the present invention will now be described, purely by way of example, with reference to the accompanying drawings, in which.

Figure 1:
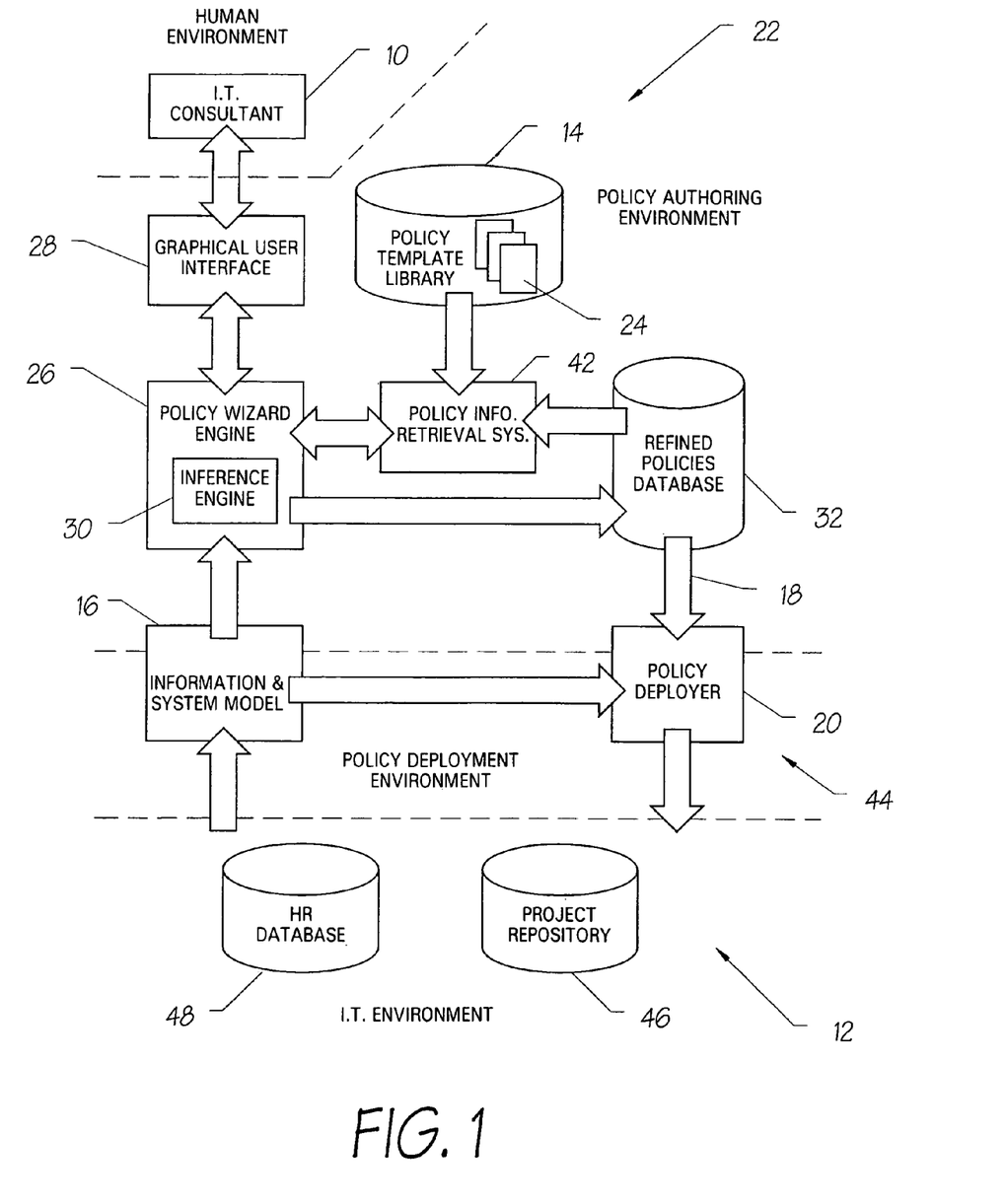
FIG. 1 is a schematic diagram of a computer system having policy authoring and policy deployment systems.

Referring to FIG. 1, the embodiment of the invention which will now be described is designed to provide an IT consultant 10 with an easy way to define security policies in an IT environment 12. The system supports the refinement of role based access control policies for security management. Starting from a library 14 of policy templates, the system drives the consultant 10 during the process of refining security policies. A reference to the "real" world is performed using an underlying information and system model 16. The output of the above process is a set of deployable policies 18 that can possibly be passed to an (external) deployment tool 20 to be deployed into the underlying IT system 12.

The security management of an IT environment 12 is a complex task. Consultants who work in this sector are aware of this fact. They have to understand what are the IT environment entities to be secured, what are the current security risks (risk analysis), which actions must be taken in order to minimise those risks and how to implement them. A security consultant could improve the effectiveness of their work if they were supported by IT tools that help both in defining and deploying the security strategies.

Policies are a common way to define security requirement and expectation. Statements like "all the PCs must be protected by passwords", "all the confidential documents can be read just by employees", etc. are simple examples of security policies. Usually consultants get an understanding of those policies and then they try to apply them to the real IT environment.

Much effort has been expended in defining security policies from two extreme perspectives:

an abstract level, in which policies are natural language statements that can be easily understood by humans, but are absolutely not understandable by a computer program; and an implementation level, in which policies are statements at the "machine level"; sometimes they are represented with an obscure language and formalism and they depend on the particular system they are going to be deployed.

For example, access control policies are very focused on defining who can access what: "a user x can read a file y", "a user x can modify a document d1". The advantage is that computers can process them. The disadvantage is that those policies are very focused on low level implementation details: the real "humanly understandable" meaning of the policy has been lost.

What is missing is a smooth transaction process between these two kinds of policies; something that, starting from a real humanly understandable policy, results in a low-level implementable policy. This is the one of the problems that is addressed by the embodiment of the invention. The process of adding more and more details to a policy while maintaining a humanly understandable aspect will be referred to as "refinement".

The aim is to provide a tool that can support a consultant in retrieving (high level) relevant security policies for the IT environment under analysis and refining those policies according to their particular needs. This tool will be referred herein as a policy wizard authoring environment 22. The deployment and the enforcement of those policies can then be done using existing security products or ad hoc products.

The tool needs a formalised representation of both security policies and a model of the IT environment that is to be secured. Using that information, it can heavily interact with the consultant, showing a humanly readable description of the security policy to the consultant and maintaining, in the meanwhile, an internal computer understandable representation. This scenario implies the following aspects:

A formalism must be defined to represent security policy. In the embodiment, security policies are represented using policy templates 24, described using a policy template language (PTL). A policy template 24 is not only a formalisation of a policy but it contains all the knowledge necessary to suggest and manage policy refinement activities.

Someone must write those policy templates. The existence of a security policy expert is assumed. This person must have a very good understanding of both security issues and PTL. The expert, however, has merely to write high level abstract policy templates and define how they can be refined. As those templates are abstracts which define principles, but which do not strongly refer to any specific entity of an IT environment 12, they can eventually be portable. The library 14 of those policy templates 24 can be built and used when required. New policy templates can be added to the library 14, if required. A graphical editor can be employed to support the expert in writing policy templates.

Someone must write a model of the IT environment 12 to be secured. It is assumed that the consultant 10 will do that. They are the only person who has a real understanding of that environment. Graphical editors will support them during this effort. The IT environment model will be referred as the information and system model 16.

The embodiment of the invention implements a policy wizard engine 26 that is able to interpret policy templates 24, and that strongly interacts with the information system model 16. It also implements a graphical user interface 28 where policies are shown in a "natural" language format. The embodiment manages each policy using an internal machine understandable format and can interact with the policy deployer 20 for the deployment of refined policies.

The architecture of the embodiment and the components thereof will now be described in association with an explanation of the involved development activities. For further information about technical implementation details, reference should be made to Appendix D.

A policy template library 14 is a collection of policy templates 24. Each policy template 24 is a package that describes a security policy and how the consultant 10, using the authoring environment 22, can refine it. For more information about what is meant by policy, reference may be made to Appendix B. A policy template 24 is made of components, each of which is described using a declarative language that can be interpreted in an automatic way by the policy wizard engine 26 A simple example of a policy template 24 is as follows:

```
Template ( t1, [
    [ c0,  keywords,          [$creation$, $users$, $informa-
                               tion$, $people$]],
    [ c1,  category,          $Access to Information$],
    [ c2,  abstract,          $Users can add Information about them-
                               selves to the system $],
    [ c3,  description,       $Users can add new Information to the
                               system if the Information is about
                               themselves. $],
    [ c4,  expiration-date,   $01/01/1999$],
    [ c5,  deployable,        $deployable$],
    [ c6,  start,             c7],
    [ c7,  sequence,          [c8, c12,c13]],
    [ c8,  context,           [internal: [and([ about(information,
                                people) ])], refinementBy:
                                [[information,c10], [people,c10]]]],
    [ c10, refinementDetails, [category: ism, condition: [],
                                refinementBy: [class]]],
    [ c12, policyStatement,   [category: deployable, internal:
                                [ and([ canAccess(people, operation,
                                    information)]) ], condition: [],
                                refinementBy: [[people,c10],
                                [information,c10]]]],
    [ c13, end,               []]
])
```

For further information about the syntax and the concepts involved in a policy template, reference may be made to Appendix A.

A policy template 24 is implemented as a Prolog fact, and it can be easily manipulated by the policy wizard engine 26. A label (for example "t1") identifies it. Other labels (c0, c1, c2, etc.) are used to identify its template components. The semantic of each component is defined by a keyword (i.e. description, abstract, context, policyStatement, etc.). Policy template components can be classified according to different categories:

Some components just provide extra information to the consultant. For example the "abstract" and the "description" contain a humanly readable description of the policy meaning.

Other components are used to drive the "refinement flow". For example the "sequence" component defines the sequence of steps that must be done by the policy wizard engine 26 and/or the consultant 10.

However the most important components in a template 24 are those defining the structure of the security policy: "context" and "policyStatement".

A policy may be described by:

a policy context, which is a set of constraints on the "managed world"; in the above example the context specifies that the involved "information" must be about "people"; and a policy statement, which is a Role Base Access Control ("RBAC") policy—see Appendix B.

An example of a generic policy statement is: canAccess (people, operation, information)

The meaning of this policy statement is that "people" can perform "operation" on "information". The overall meaning of the policy (context and policy statement) in the above example is that "people can perform operation on information that is about them".

In general a policy context and a policy statement can be modelled as a logical expression: AND, OR, NOT of constraints/conditions.

The main goal of a policy template 24 is to store a generic policy description and provide information about its refinement to the policy wizard engine 26. For example, the above policy could be refined as: "all the members of a department can add an entry in a database if the entry contains information about them".

The policy template 24 refers to entities that are defined and described in the information system model (ISM) 16. For example "people", "operation" and "information" are ISM concepts. The policy wizard engine 26 manages the information stored inside the template 24, masking its complexity to the consultant 10. The consultant 10 will have a "humanly readable" view of the information due to the information stored in the ISM 16 and the graphical interface 28.

The information and system model (ISM) 16 is a model of the underlying IT environment 12 which is to be managed (from the security point of view). It contains a description of the system layer that actually implements the information layer. Even if it is an "external module" of the architecture, it is an important one.

The ISM 16 contains a description of environment classes (also called "entities") and the hierarchy among them. For example, "information" is a class and "document (document_name)" is one of its "sub-classes". The ISM 16 describes the relations among classes as well. For example "belongsTo (information, people)" or "memberOf (people, Organisation)" are managed relations.

From an implementation point of view, the ISM 16 may be a set of Prolog statements that can be easily accesses by the policy wizard engine 26.

The API provided by the ISM 16 will now be described. This API is accessed by the policy wizard engine 26 to get all the required ISM information to perform the refinement tasks. For further information about the syntax and the concepts involved in the ISM 16, reference may be made to Appendix C.

The API that is provided by the ISM 16 and that is used by the policy wizard engine 26 is as follows:

| ISM API function | Description |
| --- | --- |
| GetClassHierarchy (class, hierarchy tree) | It provides the class hierarchy that has "class" as root. For example, given the class "orgUnit(Name)" the result could be: cTree(orgUnit(Name), [cTree(department(X),[]), cTree(project(Y), [])], meaning that department(X) and project(Y) are "sub-classes" of an organisation (orgUnit(Name)) |
| GetRelationDescription (relation, description) | It provides the description of a relation. For example, if the relation is "belongsTo(X,Y)", we get as a description [1,' belongs to ',2]. The numbers 1 and 2 are placeholders for the classes (entities) involved in the relationship. |
| GetRelationArgDescription (relation, pos, description) | It provides the description of the arguments (classes) that are involved in a relation. |
| GetRelationArgType (relation, pos, type) | It provides the type of a relation argument. It could be a basic one (like "String") or a another ISM class. In that case the type is "ism". |
| GetClassDescription (class, description) | It provides the description of a class. For example if the class is "people", its description could be ['A person or a well defined group of people']. |

-continued

| ISM API function | Description |
| --- | --- |
| GetClassArgDescription (class, pos, description) | It provides the description of a class identifier. For example, if the class is "department(X)" the description of its unique identifier (X, pos = 1) is ['department name']. |
| GetClassNumberOfArgs (class, number) | It returns the number of identifiers of a class. |
| GetClassArgType (class, pos, description) | It provides the type of a class identifier. It could be a basic one (like "String") or a another ISM class. In that case the type is "ism". |
| GetClassNumberOfAttributes (class, number) | It provides the number of attributes of a class. For example, a class attribute could be the creation date for a document. |
| GetClassAttributeDescription (class, pos, description) | It provides the description of a class attribute. |
| GetClassAttributeType (class, pos, type) | It provides the type of a class attribute. |

The policy wizard engine 26 is the central component of the policy authoring environment architecture. It is the combination of:

- a prolog inference engine 30;
- procedures that are able to manipulate the policy templates 24 according to the policy template format, providing support to the graphical user interface 28;
- procedures that save/manipulate deployable policies;
- procedures that interact with the policy deployer 20 using a defined API; and
- procedures that are able to interact with the information and system model (ISM) 16 using a defined API.

The policy wizard engine 26 is used by the UI 28 during a policy template instantiation and refinement process: it knows how to interpret template components and how to "drive" the consultant 10 during that process. The policy wizard engine 26 (at the end of the instantiation and refinement process) is able to save a deployable policy; that policy could be managed again later or it could be sent to the policy deployer environment.

At the system start-up, the policy wizard engine loads a knowledge-base containing all the procedures necessary to perform the activities described before. The policy template library 24 is loaded as well.

The consultant 10 can interact with the policy wizard engine 26 using the graphical user interface 28, through an API. They can perform the following tasks:

- initialise the policy wizard engine 14;
- retrieve a list of available policy templates 24 and their attributes;
- manage policy template interpretation;
- refine policy entities;
- add extra constraints (conditions) to the policy context; and
- manage the policy template refinement cycle. These tasks will now be described, together with the associated API.

At the start up of the system, an instance of the policy wizard engine 26 is created. The UI 28 asks it to load the required knowledge base, i.e.:

- the ISM 16;
- prolog procedures;
- the policy template library 14;
- any policy templates refined in a previous session (from a refined policies database 32); and
- any policy templates deployed in a previous session.

The initialisation API of the policy wizard engine 26 is as follows:

| API function | Description |
| --- | --- |
| Loader | Load the required "knowledge base" in the policy wizard engine. |

The task of retrieving policy templates 24 and their attributes can be performed according to either of two different strategies:

- retrieval of policy templates 24 according to categories of policy templates; and
- retrieval of policy templates 24 according to associated keywords.

In the former case, the category component of a template 24 is accessed and policy templates are classified according to that value. In the second case, the consultant 10 provides a set of keywords they think are relevant to describe the policy templates 24 they are interested in, and the system provides a list of policy templates whose keywords better match the expectation. In both cases, the consultant can select a proposed policy template 24 and start its refinement.

The API of the policy wizard engine 26 for retrieving policy templates 24 and their attributes is as follows:

| Policy Templates and Attributes API function | Description |
| --- | --- |
| TemplateCategoryList (CategoryList) | It provides a list of all the policy templates categories (information obtained from the category component of each template). |
| FindTemplatesByCategory (Category, TemplateIds, Abstracts) | It retrieves a list of all the templates (template Identifiers) and their abstract descriptions belonging to the provided category |
| KeywordList (Keywords) | It provides a list of all the keywords defined in the policy template library. |
| FindTemplatesByKeywords (KeyList, TemplateIds, Scores, Abstracts) | It provides a list of all the templates (template identifiers) that match some of the keywords that have been provided in input. An abstract description of the template is provided as well, with the matching score value. |
| RetrieveDescriptiveTemplateWords (ReservedWords, Descriptions) | It provides a list of the policy template keywords that contain descriptive information (description, abstract, deployable, etc). |
| GetTemplateComponent (TemplateId, ComponentId, Key, Param) | Given a template (template identifier) and either a component identifier or a component keyword, it provides the associated "value". |

Figure 2:
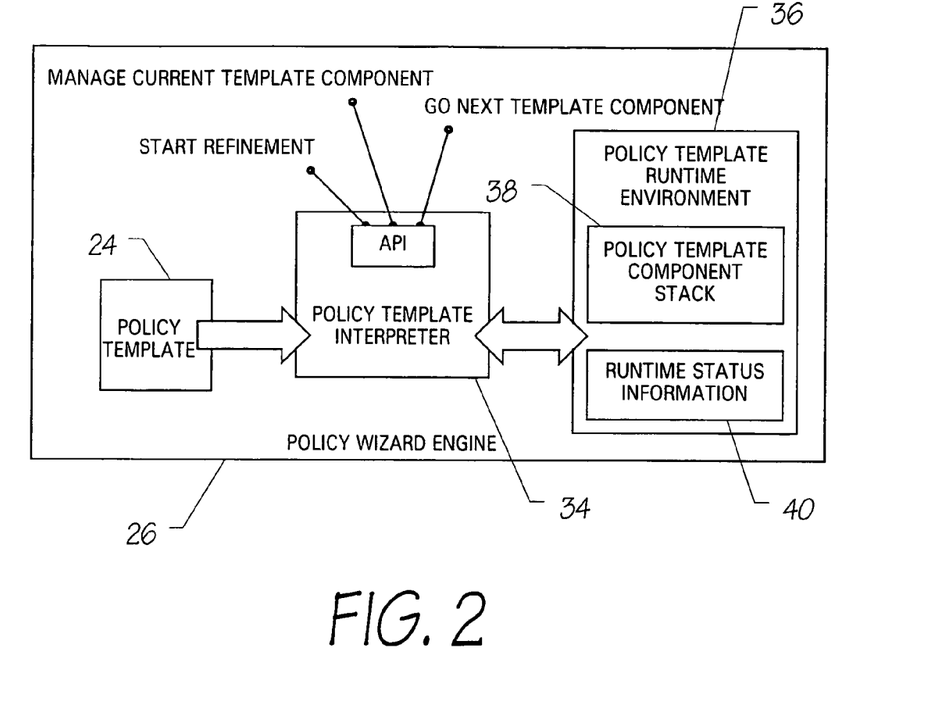
FIG. 2 is a schematic diagram of a policy template interpretation module employed in the system of FIG. 1.

Referring also to FIG. 2, the policy wizard engine 26 contains a module 34 whose goal is to interpret policy templates 24. The interpretation phase happens according to a flow that is described by some components inside the templates themselves. As an example, the following "flow directives" can be implemented:

- "start"—this indicates which component the policy template interpretation must start from;
- "sequence"—this contains a list of other policy template components that must be processed;
- "choice"—this is a choice point, which can be used, for example, when a new constraint is to be added to a policy context—according to the selected choice, there is a jump to another policy template component; and "end"—this indicates that the policy template interpretation is finished.

Policy template interpretation is a step-by-step activity and it is driven by the UI 28. When the interpreter 34 is asked to start the interpretation of a template, it creates an interpretation environment, identified by a respective environment Id. The interpretation environment contains at least one policy template runtime environment 36, identified by a respective runtime Id, according to the number of involved policy templates. (It could happen that the interpretation of a policy template causes another template to be interpreted. In such a case a new runtime environment could be added to the interpretation environment).

Each runtime environment 36 contains a stack 38 of the policy template components to be managed and some status variables 40. At each step, the interpreter 34 is asked to manage the current template component. This activity consists in interpreting the current template component and creating the infrastructure necessary to support the interaction with the UI 28. At this point, according to the current component specifications, the UI 28 can interact with the policy template engine 34 using the appropriate API, for example to start the refinement process of a class or to visualise a choice point, etc. When the current template component has been managed, the interpreter is asked to go to the next template component.

The policy wizard engine API that provides the previously described features will now be described. The API that starts and then manages policy template interpretation is as follows:

| Manage the policy template Interpretation API function | Description |
| --- | --- |
| StartRefinementProcess (TemplateId, EnvId, RunTimeId) | It starts the refinement of the template identified by "TemplateId". It returns the Environment and Runtime identifiers. |
| GetCurrentTemplateComponent (EnvId, RunTimeId, CompId, ResKeyword, CompParam, RunTimeParam) | It provides information about a template component under interpretation. |
| ManageCurrentTemplateComponent (EnvId, RunTimeId) | It asks the Policy Wizard Engine manages the current template component. |
| GoNextTemplateComponent (EnvId, RunTimeId) | It asks the Policy Wizard Engine to go to the Next Template Component. |

An important activity that can be performed, during the interpretation of a policy template, is the refinement of entities (classes) both in the policy context and the policy statement. Considering the (very simple) policy template that has been discussed above, that template describes the following policy:

Policy Context: about (information, people)

Policy Statement: canAccess (people, operation, information)

A consultant could be interested in refining, for example, the information entity. They must be able to get the refinement tree associated to that entity and choose the refinement they like. Supposing they choose "document (name)". Both the policy context and the policy statement must be updated according to that choice. The refined policy will be:

Policy Context: about (document(name), people)

Policy Statement: canAccess (people, operation, document(name))

The refinement activity can be started in two different ways:

the consultant 10 decides to refine some entities according to their own decision they choose the entities they want to refine; or the policy wizard engine 26 suggests to the consultant 10 to refine some entities, according to what has been defined in the policy templates 24—this process can be executed several times for different entities and in different periods.

In both cases, the refinement process must support the consultant 10, masking all the low level detail complexity.

An API has been defined to provide the right level of abstraction to the consultant 10. This API interacts heavily with ISM 16 to provide all the required refinement and description information. It is as follows:

| Policy Entities Refinement API function | Description |
| --- | --- |
| GetCurrentTemplateContextDescription (EnvId, RunTimeId, ContextDescriptionList) | It provides a description of the Policy Context. As the Policy Context is modelled as a logical expression, the description will be a structure visualised by the UI as a tree. |
| GetEntitiesFromContextCondition (EnvId, RunTimeId, PathList, EntityDescriptionList) | Given one Policy Context condition, it provides the description of all the entities (classes) involved in that condition. |
| GetContextEntityRefinementTree (EnvId, RunTimeId, PathList, EntityPos, RefinementTree) | It provides the refinement tree for an entity belonging to a condition, in a Policy Context. |
| SetContextEntityRefinement (EnvId, RunTimeId, PathList, EntityPos, RefinementPath) | It refines an entity with an entity chosen in its refinement tree. |
| GetCurrentTemplatePolicyDescription (EnvId, RunTimeId, ContextDescriptionList) | It provides a description of the Policy Statement. As the Policy Statement is modelled as a logical expression, the description will be a structure visualised by the UI as a tree. |
| GetEntitiesFromPolicyStatementCondition (EnvId, RunTimeId, PathList, EntityDescriptionList) | Given the Policy Statement condition, it provides the description of all the entities (classes) involved in that condition. |
| GetPolicyStatementEntityRefinementTree (EnvId, RunTimeId, PathList, EntityPos, RefinementTree) | It provides the refinement tree for an entity belonging to a condition, in a Policy Context. |
| SetPolicyStatementEntityRefinement (EnvId, RunTimeId, PathList, EntityPos, RefinementPath) | It refines an entity with an entity chosen in its refinement tree. |
| GetChoicePointEntityDescription (EnvId, RunTimeId, EntityDescription) | It provides the description of an entity whose refinement has been suggested to the consultant by the Policy Wizard Engine. |
| GetChoicePointEntityRefinementTree (EnvId, RunTimeId, DescriptionTree) | It provides the refinement tree for an entity whose refinement has been suggested to the consultant by the Policy Wizard Engine. |
| SetChoicePointEntityRefinement (EnvId, RunTimeId, RefinementPath) | It refines an entity (whose refinement has been suggested to the consultant by the Policy Wizard Engine) with an entity chosen in its refinement tree. |

Another important activity that can be performed, during the interpretation of a policy template, is to add a new constraint (condition) to the policy context. A policy template usually pre-defines what conditions are part of the policy context (conditions statically included). However the policy wizard engine (during the interpretation of the policy template) can ask the consultant if they want to add an extra constraint to the policy (conditions added at runtime). Considering the policy template discussed above that describes the following policy:

Policy Context: about (information, people)

Policy Statement: canAccess (people, operation, information), the consultant 10 could be asked if they want to add extra constraints to the policy context, such as "belongTo (information, department)", or "memberOf (people, department)". If the consultant 10 accepts both, the refined policy would be:

Policy Context: about (information, people) AND belongTo (information, department) AND memberOf (people, department)

Policy Statement: canAccess (people, operation, information).

The new constraints become part of the policy context and the involved entities can be refined as described previously.

The policy wizard engine provides an API that manages the process of adding a new constraint to the policy context, as follows:

| Add extra constraint to the "Policy Context" API function | Description |
| --- | --- |
| GetChoicePointConstrainDescription (EnvId, RunTimeId, ConstrainDescription) | It provides the description of the constraint to be (possibly) added to the Policy Context. |
| SetChoicePointConstraint (EnvId, RunTimeId, Choice) | It adds the suggested constraint to the Policy Context if the Choice is "accept" otherwise nothing is done. |

A policy template 24 under refinement has an associated status that changes according to the phase it is involved in. The consultant 10 starts the refinement activity of a policy template. At one point they decide to accept the current state of refinement: in that case the policy is moved in the "refined" state. The consultant 10 could later decide to refine again the policy template or just to deploy it. Both refined and deployed policies can be saved on files and can be reloaded in the policy wizard engine knowledge base. The policy wizard engine 26 provides an API that manages the policy refinement cycle, as follows:

| Policy template "Refinement cycle" management API function | Description |
| --- | --- |
| SetCurrentTemplateAsRefined (EnvId) | It sets the specified template as a "refined" one. |
| GetRefinedTemplatesInformation (RefTemplatesInformation) | It retrieves information about the refined templates (template Ids and abstract description). |
| SetCurrentTemplateAsRefinable (EnvId) | It sets the specified refined template as "refinable" again. |
| DeployRefinedTemplates | Deploys all the refined templates. The status of all those templates becomes "deployed" |
| GetDeployedTemplatesInformation (DeployedTemplatesInformation) | It retrieves information about the deployed templates (template Ids and abstract description). |
| SaveRefinedPolicyTemplates | It saves on file the refined policy templates. |
| SaveDeployedPolicyTemplates | It saves on file the refined policy templates. |

As shown in FIG. 1, a policy information retrieval system 42 is a module whose goal is to retrieve policy information from the policy template library 14. A consultant 10, at the beginning of the policy refinement/instantiation process, might be interested in knowing what are the policy templates 24 that are pertinent to the problem they are trying to solve. For example, they could be interested in all the policies that deal with "roles", "certificates" and "Password". The idea is to associate "keywords" to the policy templates describing the meaning of the policy. The consultant 10, before starting the retrieval process, will select, from a list of possible keywords, those that describe the policy template they are interested in. The retrieval system 42 will search and present the retrieved policies showing their descriptions. The policy information retrieval system can be implemented as a set of Prolog predicates that can be managed by the policy wizard engine 26. The API to access the associated functionality has already been described above.

In FIG. 1, the refined policies database 32 is a set of instantiated and refined policy templates generated by the policy wizard engine 26. The system stores those policies in order to perform two possible future activities:

deploy those policies by sending them to the policy deployer 20; and make those policies available to the consultant/other system modules for further manipulations.

While the policy template library 14 is a knowledge base which is virtually independent of the underlying system or configuration, the deployable policies have hooks to the real word by referring to entities described in the information and system model 16. Moreover, the deployable policies are entities that must be understandable by the policy deployer 20 in order actually to deploy them in the real word. The deployable policies database 32 may be implemented as a flat file where all the runtime environments, associated to refined policy templates, are stored. The policy wizard engine 26 provides an API (described above) to perform the storage and the retrieval of those refined policy templates.

The graphical user interface 28 is the part of the architecture that provides the consultant 10 with an easy and simplified way to access the system functionality. The UI 28 hides the low-level policy details (policy template infrastructure, low-level language, etc.) from the consultant 10. It is quite interactive, asking the consultant 10 for all the required information, in an easy way. The UI 28 heavily interacts with the policy wizard engine 26, through its API, in order to obtain the necessarily information to configure itself during the refinement process. It is designed to provide the following functions:

Retrieve a list of available policy templates and their attributes;

Start the refinement process of a chosen policy template;

Refine policy "Entities";

Add extra constraint (condition) to the "Policy Context"; and

Provide support for the Policy Template "Refinement cycle".

These functions can be easily mapped into the tasks that can be performed by the policy wizard engine 26. The main goal of the UI 28 is to mask the complexity of policy template management providing an acceptable level of abstraction.

All the main tasks can be accessed by a console of the UI 28 from a "Tools" menu having a drop-down list for selecting:

Policy Template Selection;
Visualize Refined Policies;
Visualize Deployed Policies; and
Save Refined and Deployed Policies Policy templates 24 can be selected and retrieved from the policy template library 14 in two different ways, using a sub-list from the Policy Template Selection item containing:

By Policy Category (Each policy template has been classified according to the policy category it refers to. For example one policy category could be "Access to Information". Policy templates are retrieved from the database and graphically presented to the consultant after being classified by categories.)

By Keywords (Each policy template has a set of keywords (strings) associated, describing the subject and the behaviour of the policy. The user can select keywords from a list and all the templates matching those keywords are retrieved and presented to the consultant.)

If the consultant 10 chooses to retrieve policy templates by categories, the system interacts with the policy wizard engine 26 using the proper API and opens a new window which shows a list of policy template categories and an abstract description of all the policy templates belonging to each category. The consultant 10 can select one abstract description and get more details about the real meaning of the respective policy. They can start the refinement of the desired policy by pushing a "Start Refinement Process . . . " button.

On the other hand, if the consultant 10 chooses to retrieve policy by specifying keywords, the system opens a new window listing all of the available keywords. The consultant can then select one or more required keywords and then push a "Retrieve . . . " button, as a result of which all the policy templates containing that keyword/those keywords are retrieved and displayed. The consultant 10 can select one abstract description and get more details about the real meaning of the respective policy.

After the consultant 10 has selected the policy template 24 they are interested in, the policy wizard engine 26 starts to interpret the template. In order to better describe the refinement functionality, the refinement of the following policy template will be described:

Template(t3, [
| [ c0, | Keywords, | [$engineer$, $information$, $organisation$ ]], |
| [ c1, | Category, | $Access to Information$], |
| [ c2, | Abstract, | $All engineers can perform operations on information within their organisation$], |
| [ c3, | Description, | $Users that are Engineers can perform operations on information that belong to the same organisation they belong to].$], |

-continued

| [ c4, | Expiration-date, | $01/01/1999$], |
|---|---|---|
| [ c5, | Deployable, | $deployable$], |
| [ c6, | start, | c7], |
| [ c7, | Sequence, | [c8, c12, c13, c16, c18]], |
| [ c8, | Context, | [internal: [and([belongsTo(information,orgUnit(U)), isMember(user (Un, UId), engineer), isMember(user(Un, UId), orgUnit(U))])], refinementBy: [[information,c10], [orgUnit(U), c10]]]], |
| [ c10, | RefinementDetails, | [category: ism, condition: [] refinementBy: [class]]], |
| [ c12, | PolicyStatement, | [category: deployable, internal: and([canAccess(user(Un, UId), operation, information)])], condition: [] refinementBy: [[user(Un,UId),c10], [information, c10]]]], |
| [ c13, | ClassRefinementChoice, | [class: [orgUnit(U),c10]]], |
| [ c16, | ConstraintChoice, | [constraint:[and([about(information, user(Un, UId))])], choices: [accept:c18, ignore:c18]]], |
| [ c18, | end, | []] |
])

The associated policy states that "Engineers can perform operations on information that belongs to the same organisation they belong to". The policy is quite abstract. Many entities are involved: "operations", "information" and "organisation". The information and system model 16 which has been loaded describes all of these entities and the available refinement trees. The consultant 10 is aware of the meaning of the policy because they were given both an abstract description of it and a more detailed one when they chose the template to be refined.

The policy template formalises the policy. The real policy is described in the policy context (component c8) and policy statement (component c12). When the consultant starts the refinement process of a policy template, a new window is opened. A more friendly description of the "formalised" policy is presented to the consultant. In this example, the policy context is formalised as a conjunction of the following constraints:

"User" is member of "Engineer role"
"User" is member of "organisation entity"
"A collection or individual piece of information" must belong to "organisation entity" and the policy statement is formalised as:
"User" can perform "Operation" on "A collection or individual piece of information".

The consultant 10 can then select a particular constraint and is then given a list of all of the relevant refinable entities. At this point the consultant 10 can refine the entities they are interested in. The policy wizard engine 26 is, however, able to suggest the refinement of some entities, if that behaviour has been specified in the interpreted template.

In the case of refinement of entities suggested by the policy wizard engine 26, a "Refinement Choice Point" tab is enabled. This means that the policy wizard engine 26 is suggesting the consultant 10 refines some entities. If the consultant 10 selects the refinement choice point tab, they are given more details about the suggested refinement. For example, the policy wizard engine 26 might suggest refining "organisation entity" (as written in the component c13 of the policy template). The consultant 10 can navigate in the refinement tree associated to the entity (the information displayed being retrieved from the ISM 16, using the proper API) and choose the refinement they prefer. For example, if the consultant 10 chooses to refine "organisation entity" with the "department" entity, this refinement is reflected now both in the policy context and in the policy statement. The internal representation of the policy has been updated by the policy wizard engine 26 and the high level representation reflects those changes. The consultant 10 can access the refined policy by asking the UI 28 to visualise again the policy context and the policy statement. In the example, the refined policy context is:

"User" is member of "Engineer role"
"User" is member of "A department"
"A collection or individual piece of information" must belong to "A department".

However, at any time, the consultant 10 can also decide what is the entity they want to refine and do that. Suppose that the consultant 10 decides to refine the "collection or individual piece of information" entity. To do this, they select the desired entity in an "Involved Entity" list. The entity refinement tree is then displayed in a "Entity Refinement" tab panel. The consultant 10 can then select one of the possible entity refinements (according to the ISM 16) and confirm the refinement. Again, the policy wizard engine 26 updates the policy context and the policy statement. In the example, say the consultant 10 chooses to refine the selected entity with "calendar entry" (that is, a very specific kind of information).

The above process can be repeated as many times as the consultant 10 desires until they have achieved the right refinement of the policy template.

Another feature which is implemented is the possibility to add a new constraint to the policy context, at runtime. The policy template is written such that a new constraint might be added with the description of what happens if the consultant 10 decides to accept or ignore the new constraint. In the policy template used as an example, the component c16 contains this information. The policy wizard engine 26 interprets that component and the UI 28 asks the consultant 10 to make a choice, presenting a question in a tab panel. In the example the proposed extra constraint is:

"An entry in the calendar" is about "User"

meaning that the consultant 10 can choose to enforce the fact that the information (calendar entry) must be about the user. The consultant 10 can accept or ignore the constraint. The policy wizard engine 26 proceeds to interpret the policy template according to the choice that has been made. If the constraint is accepted, it is added to the policy context, so that, in the example, the policy context is displayed as:

"User" is member of "Engineer role"
"User" is member of "A department"
"An entry in the calendar" must belong to "A department"
"An entry in the calendar" is about "User"

Once the consultant 10 has achieved the desired refinement of a policy, they can accept the refinement by pushing the corresponding button. The policy template now has a status of "Refined State". It is possible to open a new window (from the UI console) displaying the list of all the refined policy templates. The consultant 10 can visualise the policy context and the policy statement of each refined policy templates. They can decide to refine again a policy template, in which case they push a "Refine Policy Again . . . " button and they then access the previously defined environment.

The consultant 10 can also save the refined policies in a file, using the Tools menu on the UI 28. The consultant 10, on the other hand, could decide to deploy the block of refined policies. They can do that by pushing a "Deploy Policy" button, and the real deployment of the refined policy templates is then delegated to the policy deployment environment 44. The policy wizard engine 26, however, keeps track of which policies have been deployed, and the consultant 10 can visualise the set of deployed policy in another window. The consultant 10 can also save the deployed policies in a file, using the Tools menu on the UI 28.

As intimated above, the policy authoring environment 22 has two links to external components, namely:

The information and system model (ISM) 16. The policy authoring environment 22 needs to access abstract information about the underlying system 12 and its logical organisation. For example, it could be interested in getting a list of all the roles and their hierarchical relationships or the list of information and system components or just specific resources. That information is contained in the ISM 16, and the policy authoring environment 22 can access it using an ISM API.

The policy deployment environment 44. The policy authoring environment 22 interacts with the policy deployment environment 44 to deploy deployable policies. Both environments share a common background about the semantic associated to deployable policies. A common description of those deployable policies is shared among the two environments. An API is defined between the two environments.

The policy deployment environment 44 will now be described in more detail. It is the component in the overall policy architecture taking the refined high level policy descriptions and instanciating them as system information which can then be deployed.

Take as an example a policy specifying that project managers can read documents about all projects within their department and can read and write documents about their own project. In prior art environments, such policies may, for example, be written in project procedure manuals, and each project manager (or system administrator) would be left to interpret and act on them to ensure their conformance. The policy deployment system aims to automate this task to ensure conformance thereby reducing the risk of mistakes and security holes.

The policy system would have an organisational description such that it understands various definitions such as project manager and project documents (from the ISM 16), and these general definitions are introduced into the policy statements during the refinement process. The ISM 16 also includes a description of how to obtain all the instances of the class information within the IT environment 12 of an organisation. For example, it may refer to a database 46 containing project information, or a HR database 48 to identify all employees. The policy deployer 20 uses each of these information sources, applies the policy constrains to them and generates an appropriate set of deployment instructions.

The deployer 20 is given each policy consisting of a policy context defining who it applies to and a statement which specifies the necessary configuration. In the example there are two policies, so just take the first:—
Context:
   Y=project managers in department X
   Z=Project information belonging to department X
Statement:
   Y can read Z (or Y can access Z to Read)

This needs to be converted into a series of instructions which when applied will produce an access control list ("ACL") for all project information (as specified in the ISM 16) such that the other project managers in the department can read it.

A deployment algorithm could be used to generate a set of context data via combined database operations. In this case, project managers and their departments can be selected from the HR database 48 and put into a table:

| PM  | Dept |
| --- | ---- |
| Pm1 | D1   |
| Pm2 | D2   |
| Pm3 | D1   |

A second table would be generated from the project repository 46 so that it contains a set of information identifiers along with the department to which they belong, as follows:

| Info | Dept |
| ---- | ---- |
| Doc1 | D1   |
| Doc2 | D2   |
| Doc3 | D1   |

These tables can then be joined to create a relation between project managers and project documents linked via the department, as follows:

| PM  | Info |
| --- | ---- |
| Pm1 | Doc1 |
| Pm2 | Doc2 |
| Pm3 | Doc1 |
| Pm1 | Doc3 |
| Pm3 | Doc3 |

This could be executed as an SQL database command where the policy deployer 20 calculates the particular SQL command that must be run. In the embodiment of the invention, however, the policy context is a logic statement and it is directly interpreted in a Prolog system by running a query to evaluate all possible answers which gives an equivalent, albeit less efficient, implementation.

A simple implementation strategy would be to produce a set of instructions that directly applied the resulting table to the machine. However this would lead to runtime efficiency problems with large access control lists as well as large maintenance problems as people leave, change jobs etc.

The next stage is to try to group people into logical groups by doing an analysis of the resulting context enumeration. In this example, it is clear that all project managers in the same department are getting the same rights and so a series of groups of PMs in department X can be created.

Certain groups may already exist on the system, and these will be defined within the ISM 16. A check is therefore made against existing groups to check to see if they have been defined. If they have they can be referenced, otherwise instructions must be generated to create the group, for example:
  CreateGroup PmsInDept1
  AddUser(pm1, PmsInDept1)
  AddUser(pm3, PmsInDept1)
  CreateGroup PmsInDept2
  AddUser(pm2, PmsInDept2)

The context enumeration table can now be simplified by referring to groups of people rather than individuals, as follows:

| Group      | Info |
| ---------- | ---- |
| PmsInDept1 | Doc1 |
| PmsInDept1 | Doc3 |
| PmsInDept2 | Doc2 |

Another optimisation is to roll this grouping into the earlier context enumeration algorithm.

A context set now exists in the form of a table of data (with some optimisations); the policy statement can now be applied. In this case this involves looking at the form of the data to be secured (ie what is the document) and applying the appropriate access control list generation instruction. For example, if the documents are web pages, then a set of configuration instructions that can be interpreted by a web server agent would be generated. Alternately, if the documents reside on a shared file system, the appropriate OS system commands would need to be generated. In both cases, the form is very similar, for example:
  AddGroupToACL(Doc1, read, PmsInDept1)
  AddGroupToACL(Doc3, read, PmsInDept1)
  AddGroupToACL(Doc2, read, PmsInDept2)

In the above examples, only one type of policy statement is discussed, the "can access" statement. In the case where more than one type of policy statement can be employed, each type of statement will be applied in a slightly different way and 'plug in' statement modules may be provided for the different types. Also, a check may be made initially to ensure that the policy statement is of a known type.

In the context enumeration, other optimisations can be applied, in addition to or instead of the optimisation of grouping people. The applicability of these will be dependent on the policy statement. Other optimisations may be applied when information changes such that only changed statements are considered. For this stage a number of optimiser modules could exist and would be turned on by the policy statement type as well as the mode of using the deployer 20 (e.g. new configuration, or update).

Each statement type (e.g. canAccess) may have its own interpretation module which defines how that statement can be linked to the underlying system. In the case of the canAccess module, this interprets access control policy statements by generating instructions to manage user groups and associate users or groups, access control permissions (eg read/write) and the actual resource. The example given above shows the type of result that is produced, which in its entirety is:
  CreateGroup PmsInDept1
  AddUser(pm1, PmsInDept1)
  AddUser(pm3, PmsInDept1)
  CreateGroup PmsInDept2
  AddUser(pm2, PmsInDept2)
  AddGroupToACL(Doc1, read, PmsInDept1)
  AddGroupToACL(Doc3, read, PmsInDept1)
  AddGroupToACL(Doc2, read, PmsInDept2)

The deployment instruction set which is generated should be securely distributed to deployment agents that will execute them. The instruction sets may either be encoded as signed data or signed enveloped data according to the PKCS7 (or similar) standard. The data is enveloped in cases where the contents are considered sensitive. The signing ensures that the agent can check what generated the instruction and therefore whether it should execute the commands. The agent preferably generates a receipt to give the result of the deployment (again as signed or signed enveloped data) so that the policy management console can be confident of the state of the policy deployment.

It will be appreciated that many modifications and developments may be made to the embodiment of the invention described above. For example:

A simple graphical UI may be implemented to edit the policy templates;

Extra functionality may be added to the policy template language and policy wizard engine, such as:

management of attributes belonging to classes and relations;

management of sequences of "nested" templates (template hops);

management of other aspects to be associated to a policy description (besides policy context and policy statement), such as "events".

management of iteration. The same refinement process could be repeated more than once, for example for all the sub-classes of a class.

management of multiple selections during the refinement of an entity.

Extra modules may be added to the architecture, for example for:

analysis of refined policies to discover inconsistencies and conflicts;

management of meta-policies as a way to better control the refinement process, according to the actual refinement context.

It should be noted that the embodiment of the invention has been described above purely by way of example and that many other modifications and developments may be made thereto within the scope of the invention.

Description—Appendix A

Policy Template Language

The Policy Template Language (PTL) is the language used to describe a policy template 24 in a formal way. A policy template stores information about a policy and its refinement process. The PTL language permits the definition of a "component-oriented" policy template. Components each have their own behaviour, and they can be put together to create a policy template. Due to this approach, the language is modular and it is quite easy to extend it. This language is intended to be used by an expert who has an understanding of both definition and refinement of policies and of the information and system model (ISM) concepts.

The policy template language has been defined using Prolog statements. It can be quite simple but it can be extended as soon as new requirements arise. A generic policy template has the following format:

Template( Template Identifier, [Component 1, Component 2, Component 3, . . . ,Component n]).

where: Template Identifier is an unique identifier of the template; and Component X is the real component of a template.

A policy template component has the following format:

[Component Identifier, Keyword, Parameters]

where: Component Identifier is a unique identifier for a component, within a policy template; Keyword is a string that defines the semantic of the component; and Parameters is a structure, even complex, whose meaning depends by the semantic associated to the component.

The individual policy template components will now be described.

The keywords component contains a set of keywords that can be used to describe a policy template. Those keywords are used during the policy template retrieval phase. The format is:

[cx, Keywords, [$key1$, $key2$, $key3$, . . . $keyZ$]]

and an example is:

[c0, keywords, [$creation$, $users$, $information$, $people$]

The category component contains a string that classifies the policy template according to its functionality. A policy can be, for example, "access control policy", an "authorization policy", etc. The category string is used during the policy template retrieval phase. The format is:

[cx, category, $category string$]

and an example:

[c0, category, $Access to Information$]

The abstract component contains a string that gives an abstract description of the policy contained in the policy template. The format is:

[cx, abstract, $abstract string$]

and an example is:

[c2, abstract, $Users can add Information about themselves to the system $]

The description component contains a string that gives a detailed description of the policy contained in the policy template. The format is:

[cx, description, $description string$]

and an example is:

[c3, description, $Users can add new Information to the system\r\nif the Information is about themselves . . . $], The expiration-date component defines the expiration-date of the policy contained in the policy template. The format is:

[cx, expiration-date, $date$]

and an example is:

[c4, expiration-date, $01/01/1999$]

The deployable component is a flag that says if the policy contained in the policy template can be deployed. In some embodiments, all the templates may be set to be deployable. Other embodiments may be able to deal with very abstract templates (not deployable) and manage the refinement of a chain of templates. The format is:

[cx, deployable, $flag$]

and an example is:

[c5, deployable, $deployable$]

The start component is a directive used by the policy wizard engine to identify the first template component to be interpreted. The format is:

[cx, start, ComponentId]

and an example is:

[c6, start, c7

The sequence component is a directive that defines a sequence of components to be interpreted by the policy wizard engine. The format is:

[cx, sequence, [ComponentId1, ComponentId2, ComponentId3 . . . ComponentIdk]]

and an example is:

[c7, sequence, [c8, c12, c13, c16, c18]]

The context component is a directive that defines the Context of a Policy. The format is:

```
[ cx, context, [internal: [ <policy context logical expression> ]
    refinementBy: [
        [ <ISM entity1>, componentId1 ],
        [ <ISM entity2>, componentId2 ],
        [ <ISM entity3>, componentId3 ],
        . . .
        [ <ISM entityn>, componentIdn ]]]]
``` and an example is:

```
[ c8, context, [internal: [and([belongsTo(information,orgUnit(U)),
        isMember(user(Un,UId), engineer),
        isMember(user(Un,UId), orgUnit(U))])],
    refinementBy: [
    [information,c10],
    [orgUnit(U),c10]]]]
```

The <policy context logical expression> is a logical expression built using AND, OR and NOT logical operator. It combines ISM relations in order to define the policy context in a meaningful way. The complete BNF syntax is as follows:

<logicalExpression> ::= and([<logicalExpression> {',' <logicalExpression>}]).

<logicalExpression> ::= or([<logicalExpression> {',' <logicalExpression>}]).

<logicalExpression> ::= not([<logicalExpression>]).

<logicalExpression> ::= <ISM relation>

<ISM relation>::=any ISM relation

An ISM relation is a predicate that defines an association between ISM entities (classes). Some examples of ISM relations are as follows:

is Member (people, orgUnit (Name))

belongsTo (information, people)* about (information, people)

New entities and relations can be added to the ISM in a very flexible way, according to the "world" that the consultant needs to model and the policy requirements.

The refinementBy tag (in the context component) defines what are the ISM entities, in the logical expression, that can be refined. For each entity is associated a "refinement details" component (described in another section) that describes how the entity can be refined.

The policyStatement component is a directive that defines the Statement of a Policy. The format is:

```
[ cx, policyStatement, [category: flag,
    internal: [ <policy statement logical expression> ]
    condition: [ ],
    refinementBy: [
        [ <ISM entity1>, componentId1 ],
        [ <ISM entity2>, componentId2 ],
        [ <ISM entity3>, componentId3 ],
        . . .
        [ <ISM entityn>, componentIdn ]]]]
``` and an example is:

```
[ c12, policyStatement, [category: deployable,
    internal: [and([canAccess(user(Un,UId), operation, information)])],
    condition: [ ],
    refinementBy: [
        [user(Un,UId),c10],
        [information,c10]]]],
```

The <policy statement logical expression> is a logical expression as discussed above in relation to the "context" component.

In the embodiment described above, the only policy statement that is associated to is the Role Based Access Control (RBAC) one:

canAccess (people, operation, information).

which the Policy Deployer Environment can understand and deploy. Other policy statement relations can, of course, be added to ISM.

The category tag (in the policyStatement component) defines the policy category: abstract, deployable, etc.

The condition tag (in the policyStatement component) can contain precondition or post-condition to be associated with the policy statement.

The refinementBy tag (in the policyStatement component) defines what are the ISM entities, in the logical expression, that can be refinement. For each entity is associated a "refinement details" component (described in another section) that describes how the entity can be refined.

The refinementDetails component describes how an ISM entity can be refined. It is usually referred by either a "context" or a "policyStatement" component. The format is:

```
[cx, refinementDetails, [ category: model-category,
    condition: [ ],
    refinementBy: [mode]]]
``` and an example is:

```
[ c10, refinementDetails, [category: ism,
    condition: [ ],
    refinementBy: [class]]],
```

The category tag defines the model that must be accessed to get the refinement information.

The condition tag contains any extra constraint that must be satisfied when the entity refinement information is collected.

The refinementBy tag describes the way an entity can be refined: by class and/or by instance.

The classRefinementChoice component defines an entity refinement choice point. The Policy Wizard Engine will ask the UI to prompt the consultant for a request to refine an ISM entity.

The format is:
[cx, classRefinementChoice, [class: [ <ISM entity>, componentId]]]
and an example is:
[c13, classRefinementChoice, [class: [orgUnit(U),c10]]]

The class tag contains both the ISM entity to be refined and the component identifier (usually a refinementDetails one) that specifies how the entity must be refined.

The constraintChoice component defines a constraint choice point. The Policy Wizard Engine will ask the UI to prompt the consultant for a request to accept or refuse the extra constraint. If the new constraint is accepted, it will be added to the Policy Context. The format is:
[cx, constraintChoice, [constraint:[ < logical expression>])], choices: [accept: componentId1, ignore: componentId2]]], and an example is:
[c16, constraintChoice, [constraint:[and([about(information,user(Un, UId))])], choices:[accept:c18, ignore: c18]]]

The <logical expression> is a logical expression built using an AND logical operator. The complete BNF syntax is as follows:
<logicalExpression> ::= and([<logicalExpression1>]).
<logicalExpression1> ::= <ISM relation>
<ISM relation> ::=any ISM relation The choices tag contains the list of choices to be presented to the consultant, for example "accept" and "ignore", both of which contain the component identifier the Policy Wizard Engine interpreter has to jump to.

The end component is a directive used by the Policy Wizard Engine to stop the interpretation process. The format is:
[cx, end, []]
and an example is:
[c18, end, []]

Description—Appendix B

Role Based Access Control (RBAC) Policy

A RBAC policy is a policy that defines (security) constraints and expectations on the access of resources. A classic role base access control policy defines who can access a particular set of resources and what are the allowed operations. In the embodiment of the invention, a RBAC policy is modeled as an object made by two basic components:
Policy Context—a set of constraints on the environment referred by the policy;
Policy Statement: the real policy objective.

In the embodiment, the system concentrates on RBAC policies for security management. Policies must be modeled in a machine understandable way so that both the Policy Wizard and the Policy Deployer can manipulate and manage them. The Policy Wizard must be able to present a formalized policy to the consultant in a human readable way, building this information from the internal policy representation. The Policy Wizard must be able to refine policies and map the refinement into the internal representation, as well. Policies have been formalized using "Prolog like" statements. The syntax in BNF notation is as follows:

Policy Context
<Policy Context> ::= <logicalExpression>
<logicalExpression> ::= and([<logicalExpression> ',' <logicalExpression>}]).
<logicalExpression> ::= or([<logicalExpression> ',' <logicalExpression>}]).
<logicalExpression> ::= not([<logicalExpression>]).
<logicalExpression> ::= <ISM relation>
<ISM relation> ::= any ISM relation Policy Statement
<Policy Statement> ::= <logicalExpression>
<logicalExpression> ::= and([<logicalExpression1>]).
<logicalExpression1> ::= <ISM relation>
<ISM relation> ::= canAccess(people, operation, information)

An ISM relation is a prolog predicate that defines an association between ISM entities (classes). Some examples of ISM relations are as follows:
is Member (people, orgUnit (Name))
belongsTo (information, people)
about (information, people)

while:
information, people, operation, user(X,Y)

etc. are example of ISM entities.
Some example of (very abstract) RBAC policies are as follows:
1. Users can add information about themselves
2. Administrator can add Information about Users working in the same organization
3. All engineers can perform operations on information within their organization and these policies can be modeled in the following way:

Users can Add Information about Themselves
Policy Context: and([about(information, people)])
Policy Statement: and([canAccess(people, operation, information)])
The human readable representation will be something like:
Policy Context: "information" must be about "people"
Policy Statement: "people" can perform "operation" with "information"

Administrator can Add Information about Users Working in the Same Organization
Policy Context: and([
  is Member(user(Un,UId), admin),
  is Member(user(Un,UId), orgUnit(U)),
  is Member(user(Tn,TId), orgUnit(U)),
  about(information,user(Tn,TId))])
Policy Statement: and([canAccess(user(Un,UId), add, information)])
The human readable representation will be something like:
Policy Context:
  "user" is an "admin" AND
  "user" is a member of a "organization" AND
  "user:1" is a member of a "organization" AND
  "information" is about "user:1"
Policy Statement:
  "user" can perform "add operation" with "information"

All Engineers can Perform Operations on Information within Their Organization
Policy Context: and([belongsTo(information,orgUnit (U)),
  is Member(user(Un,UId), engineer),
  is Member(user(Un,UId), orgUnit(U))])
Policy Statement: and([canAccess(user(Un,UId), operation, information)])

The human readable representation will be something like:

Policy Context:
  "information" belong to "organization" AND
  "user" is covering the "engineer role" AND
  "user" is member of "organization"
Policy Statement:
  "user" can perform "operation" with "information"

Description—Appendix C

Information System Model (ISM)

The Information and System Model (ISM) 16 is a model of the managed IT environment 12, and it is used to describe policies. The ISM 16 basically contains:

Class—a description of an environment entity—class hierarchies can be defined;

Relation—a description of association between entities.

The ISM is modular. An ISM core schema has been defined and it can be extended according to the particular needs. Both classes and relations have been implemented using Prolog statements. ISM classes and relations can be easily accessed using an ISM API. That API has been described above.

An ISM class describes an entity by providing information about the name of the entity and a set of (key) identifiers. A logical description of the class is provided as well, within class attributes. Examples of ISM classes (entities) are as follows:

```
class(people,
  classifies,
  ['A person or a well defined group of people'],
  [ ],[ ],[ ],[ ],[ ]).
class(information,
  classifies,
  ['A collection or individual piece of information'],
  [ ],[ ],[ ],[ ],[ ]).
class(operation,
  classifies,
  [' Operation '],[ ],[ ],[ ],[ ],[ ]).
```

Examples of class hierarchy are as follows:

```
class(user(Name, ID),
  classifies(people),
  ['User'],
  [key(Name,string,['name of the user']),
  key(ID,string,['Unique identifier for user'])],
  [attrib(Loc,string,['users normal place of work'])],
  [ ], [ ]).
```

```
class(orgUnit(Name),
  classifies(people),
  ['organisation entity'],
  [key(Name,string,['Name of organisational unit'])],
  [ ],[ ],[ ],[ ]).
```

Both the classes "user" and "orgUnit (Name)" derive from the class "people".

ISM relations are associations of classes. They are used to describe conditions or constraints among those classes. Examples of ISM relations are as follows:

```
class(isMember(user(U,I),orgUnit(Name)),
  classifies(relation),
  [1, ' is member of ', 2],
  [key(user(U,I),ism, ['user']),
    key(orgUnit(Name),ism,['organisational entity'])],
  [ ],[ ],[ ],[ ]).
```

```
class(belongsTo(information,people),
  classifies(relation),
  [1, ' belongs to ', 2],
  [key(information,ism,['Information']),
    key(people,ism,['owner'])],
  [ ],[ ],[ ],[ ]).
```

```
class(canAccess(people,operation,information),
classifies(relation),
[1, ' can perform ', 2, ' on ', 3],
[key(people,ism,['people']),
  key(operation,ism,['operation']),
  key(operation,ism,['information'])],
[attrib(isPolicy,String,['This relationship forms the basis of a policy statement'])],
[ ],[ ],[ ]).
```

A relation object contains both a Prolog predicate (internal relation representation) and a human readable description. A contextual description of the ISM entity involved in the relation are described as well, within some attributes.

The intention is that the consultant should write the ISM model because they are the person that has a better understanding of the environment to be managed. An ISM editor can be provided in order to mask the ISM complexity.

Description—Appendix D

Technical Details

The embodiment of the invention described above has been implemented using the following tools and components:

Amzi Prolog—Enterprise Version 4.0: this product has been used to implement the Policy Wizard Inference Engine. Amzi Prolog is a Prolog Inference Engine. The runtime component is implemented as a MS DLL whose functionality are accessible through a Java (JNI) wrapper (http:\\www.amzi.com);

Java JFC graphical libraries (swing 1.0.2): the graphical user interface has been implemented using the new JFC library, swing 1.0.2, from SUN (http:\\www.javasoft.com);

Java JDK 1.1.6.

The software was written in Java and runs as a Java Applet. The Information and System Model, the Policy Templates and the reasoning procedures were modelled and implemented in standard Prolog.

What is claimed is:

1. An apparatus for use in generating configuration information for a computer system employing hierarchical entities, the apparatus comprising:
    a policy system for receiving a definition of a high-level policy for the configuration of the computer system and permitted refinements to that policy, the definition referring to a plurality of the entities;
    an entity memory for storing information about the computer system and its environment including the entities, the hierarchy thereof and non-hierarchical relations between the entities; and
    a processor coupled to the policy system and the entity memory and operable to produce refinement of the high-level policy definition with reference to the permitted refinements thereto and the stored information about the entities to which the high-level policy definition relates in order to produce a refined policy definition deployable on the computer system, the refinement including adding details to the high-level policy definition.

2. An apparatus as claimed in claim 1, further including a user interface with which a user can interact with the apparatus.

3. An apparatus as claimed in claim 2, wherein the processor is operable, in accordance with the high-level policy definition, to present refinement options to the user via the user interface and to refine the high-level policy definition in dependence upon options selected by the user via the user interface.

4. An apparatus for use in generating configuration information for a computer system employing hierarchical entities, the apparatus comprising:
    a policy system for receiving a definition of a high-level policy for the configuration of the computer system and permitted refinements to that policy, the definition referring to a plurality of the entities;
    a user interface with which a user can interact with the apparatus; and
    a processor coupled to the policy system and the user interface and operable, in accordance with the high-level policy definition, to present refinement information to the user via the user interface so that a refined policy definition deployable on the computer system can be produced, the presented refinement information including added details to the high-level policy information.

5. An apparatus as claimed in claim 4, wherein the processor is operable to present the refinement information to the user as refinement options and to refine the high-level policy definition in dependence upon options selected by the user via the user interface to produce the refined policy definition.

6. An apparatus as claimed in claim 2, further including a library of policy templates, each template including a respective such high-level policy definition and respective such permitted policy refinements, the library being coupled to the policy system and a desired one or more of the policy templates being selectable by the user via the user interface for supply to the policy system.

7. An apparatus as claimed in claim 6, wherein the policy templates have a common format.

8. An apparatus for use in generating configuration information for a computer system employing hierarchical entities, the apparatus comprising:
    a policy system for receiving a definition of a high-level policy for the configuration of the computer system and permitted refinements to that policy, the definition referring to a plurality of the entities;
    a user interface with which a user can interact with the apparatus;
    an entity memory for storing information about the computer system and its environment including the entities, the hierarchy thereof and non-hierarchical relations between the entities;
    a processor coupled to the policy system and the entity memory and operable to refine the high-level policy definition with reference to the permitted refinements thereto and the stored information about the entities to which the high-level policy definition relates in order to produce a refined policy definition deployable on the computer system, the processor being operable, in accordance with the high-level policy definition, to present refinement options to the user via the user interface and to refine the high-level policy definition in dependence upon options selected by the user via the user interface; and
    a library of policy templates, each template including a respective such high-level policy definition and respective such permitted policy refinements, the library being coupled to the policy system and a desired one or more of the policy templates being selectable by the user via the user interface for supply to the policy system, the policy template format providing for each policy template to have a plurality of components executable in turn by the processor, at least one of the components being a flow directive and causing the processor to present such options to the user via the user interface and to jump to one of a plurality of the other components in dependence upon the flow directive and the selection made by the user via the user interface.

9. An apparatus as claimed in claim 1, wherein at least some of the entities stored in the entity memory are abstract entities, the entity memory also including, for each such abstract entity, a pointer to data in the computer system representing an instance of that abstract entity.

10. An apparatus as claimed in claim 9, wherein:
    the refined policy is in terms of a policy context referring to unbound entities and a policy statement;
    the apparatus includes a rule memory for storing rules for interpreting the policy statement as instructions executable by the computer system; and
    the processor is operable, with reference to the entity memory, to bind the unbound entities in the policy context to instances of those entities and, with reference to the rule memory, to interpret the policy statement into a series of instructions to the computer system referring to the bound instances or derivatives of them.

11. An apparatus for use in generating configuration information for a computer system, the apparatus comprising:

a policy system for receiving a policy for the configuration of the computer system in terms of a policy context referring to unbound entities and a policy statement;

an entity memory for storing, for each of the unbound entities, a pointer to data in the computer system representing at least one instance of that entity;

a rule memory for storing rules for interpreting the policy statement as instructions executable by the computer system; and a processor which is operable, with reference to the pointers, to bind the unbound entities in the policy context to instances of those entities and, with reference to the interpretation rules, to interpret the policy statement into a series of instructions to the computer system referring to the bound instances or derivatives of them.

12. An apparatus as claimed in claim 11, wherein the processor is operable to determine a group of the bound instances, and at least one of the instructions refers to such a determined group.

13. An apparatus as claimed in claim 12, wherein the processor is operable to determine, with reference to the entity memory, whether such a determined group is already defined in the computer system and, if not, to generate such an instruction to create the determined group in the computer system.

14. A method for use in generating configuration information for a computer system employing hierarchical entities, the method comprising the steps of:

receiving a definition of a high-level policy for the configuration of the system and permitted refinements to that policy, the definition referring to a plurality of the entities; and refining the high-level policy definition with reference to the permitted refinements thereto and stored information about the entities to which the high-level policy definition relates in order to produce a refined policy definition deployable on the computer system, the permitted refinement information including added details to the high-level policy definition.

15. A method as claimed in claim 14, further including the steps of:

presenting refinement options, in accordance with the high-level policy definition, to the user via a user interface; and refining the high-level policy definition in dependence upon options selected by the user via the user interface.

16. A method for use in generating configuration information for a computer system employing hierarchical entities, the method comprising the steps of:

receiving a definition of a high-level policy for the configuration of the system and permitted refinements to that policy, the definition referring to a plurality of the entities; and presenting refinement information, in accordance with the high-level policy definition, to a user via a user interface so that a refined policy definition deployable on the computer system can be produced, the refinement including adding details to the high-level policy definition.

17. A method as claimed in claim 16, wherein the refinement information is presented to the user as refinement options, and further including the step of refining the high-level policy definition in dependence upon options selected by the user via the user interface to produce the refined policy definition.

18. A method as claimed in claim 16, further including the steps of:

providing a library of policy templates, each template including a respective such high-level policy definition and respective such permitted policy refinements; and selecting one or more of the policy templates for refinement in accordance with input by the user via a user interface.

19. A method as claimed in claim 18, wherein the policy templates have a common format.

20. A method of generating configuration information for a computer system employing hierarchical entities, the method comprising the steps of:

receiving a definition of a high-level policy for the configuration of the system and permitted refinements to that policy, the definition referring to a plurality of the entities;

presenting refinement information, in accordance with the high-level policy definition, to a user via a user interface so that a refined policy definition deployable on the computer system can be produce;

providing a library of policy templates, each template including a respective such high-level policy definition and respective such permitted policy refinements;

selecting one or more of the policy templates for refinement in accordance with input by the user via a user interface;

presenting refinement options, in accordance with the high level policy definition, to the user via a user interface; and refining the high-level policy definition in dependence upon options selected by the user via the user interfaces wherein the policy template format provides for each policy template to have a plurality of components executable in turn during refinement, at least one of the components being a flow directive and causing such options to be presented to the user via the user interface and the refinement process to jump to one of a plurality of the other components in dependence upon the flow directive and the selection made by the user via the user interface.

21. A method of generating configuration information for a computer system employing hierarchical entities, the method comprising the steps of:

receiving a definition of a high-level policy for the configuration of the system and permitted refinements to that policy, the definition referring to a plurality of the entities; and refining the high-level policy definition with reference to the permitted refinements thereto and stored information about the entities to which the high-level policy definition relates in order to produce a refined policy definition deployable on the computer system, wherein the refined policy being is in terms of a policy context referring to unbound entities and a policy statement, and the stored information about at least some of the entities relates to abstract entities and includes, for each such abstract entity, a pointer to data in-the computer system representing an instance of that abstract entity;

binding, with reference to the stored information, the unbound entities in the policy context to instances of those entities; and interpreting, with reference for stored rules for interpreting the policy statement as instructions executable by the computer system, the policy statement into a series of instructions to the computer system referring to the bound instances or derivatives of them.

22. A method for use in generating configuration information for a computer system, the method comprising the steps of:
- receiving a policy for the configuration of the computer system in terms of a policy context referring to unbound entities and a policy statement;
- storing, for each of the unbound entities, a pointer to data in the computer system representing at least one instance of that entity;
- storing rules for interpreting the policy statement as instructions executable by the computer system;
- binding, with reference to the pointers, the unbound entities in the policy-context to instances of those entities; and
- interpreting, with reference to the interpretation rules, the policy statement into a series of instructions to the computer system referring to the bound instances or derivatives of them.

23. A method as claimed in claim 22, further including the steps of determining a group of the bound instances, and referring to such a determined group in at least one of the instructions.

24. A method as claimed in claim 23, further including the step of:
- determining, with reference to stored information about the entities, whether such a determined group is already defined in the computer system and, if not, generating such an instruction to create the determined group in the computer system.

25. An apparatus as claimed in claim 4, further including a library of policy templates, each template including a respective such high-level policy definition and respective such permitted policy refinements, the library being coupled to the policy system, and a desired one or more of the policy templates being selectable by the user via the user interface for supply to the policy system.

26. An apparatus as claimed in claim 25, wherein the policy templates have a common format.

27. An apparatus for use in generating configuration information for a computer system employing hierarchical entities, the apparatus comprising:
- a policy system for receiving a definition of a high-level policy for the configuration of the computer system and permitted refinements to that policy, the definition referring to a plurality of the entities;
- a user interface with which a user can interact with the apparatus;
- a processor coupled to the policy system and the user interface and operable, in accordance with the high-level policy definition, to present refinement information to the user via the user interface so that a refined policy definition deployable on the computer system can be produced, the processor being operable to present the refinement information to the user as refinement options and to refine the high-level policy definition in dependence upon options selected by the user via the user interface to produce the refined policy definition; and
- a library of policy templates, each template including a respective such high-level policy definition and respective such permitted policy refinements, the library being coupled to the policy system, and a desired one or more of the policy templates being selectable by the user via the user interface for supply to the policy system, wherein the policy templates have a common format, the policy template format providing for each policy template to have a plurality of components executable in turn by the processor, at least one of the components being a flow directive and causing the processor to present such options to the user via the user interface and to jump to one of a plurality of the other components in dependence upon the flow directive and the selection made by the user via the user interface.

28. A method as claimed in claim 14, further including the steps of:
- providing a library of policy templates, each template including a respective such high-level policy definition and respective such permitted policy refinements; and
- selecting one or more of the policy templates for refinement in accordance with input by the user via a user interface.

29. An apparatus as claimed in claim 1, wherein the high-level policy is a real, humanly understandable policy, and the refinement causes details to be added to the high-level policy to maintain the refined high-level policy a humanly understandable policy.

30. An apparatus as claimed in claim 4, wherein the high-level policy is a real, humanly understandable policy, and the presented refinement information causes details to be added to the high-level policy to maintain the refined policy a humanly understandable policy.

31. A method as claimed in claim 14, wherein the high-level policy is a real, humanly understandable policy, and the refinement adds details to the high-level policy to maintain the refined high-level policy a humanly understandable policy.

32. A method as claimed in claim 16, wherein the high-level policy is a real, humanly understandable policy, and the presented refinement information adds details to the high-level policy to maintain the refined policy a humanly understandable policy.

* * * * *